US006535513B1

(12) United States Patent
Kao et al.

(10) Patent No.: US 6,535,513 B1
(45) Date of Patent: Mar. 18, 2003

(54) MULTIMEDIA AND MULTIRATE SWITCHING METHOD AND APPARATUS

(75) Inventors: Ruey Kao, Saratoga, CA (US); Cherng-Ren Sue, San Jose, CA (US); Cem Yildirim, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/405,993

(22) Filed: Sep. 27, 1999

Related U.S. Application Data

(60) Provisional application No. 60/123,798, filed on Mar. 11, 1999.

(51) Int. Cl.[7] .............................. H04L 12/28; H04J 3/16

(52) U.S. Cl. ..................................... 370/395.1; 370/465

(58) Field of Search ................................ 370/351, 352, 370/395, 396, 398, 401, 419, 397, 358, 392, 359, 395.1, 395.52, 395.6, 395.61, 395.63, 395.64, 465, 466, 467, 468, 395.65

(56) References Cited

U.S. PATENT DOCUMENTS

| | | | | |
|---|---|---|---|---|
| 5,526,349 A | * | 6/1996 | Diaz et al. ................... | 370/392 |
| 5,623,491 A | * | 4/1997 | Skoog ......................... | 370/397 |
| 5,717,691 A | * | 2/1998 | Dighe et al. ................ | 370/401 |
| 5,781,320 A | | 7/1998 | Byers | |
| 5,802,045 A | * | 9/1998 | Kos et al. .................... | 370/352 |
| 5,809,022 A | | 9/1998 | Byers et al. | |
| 5,894,477 A | * | 4/1999 | Brueckheimer et al. .... | 370/353 |
| 5,930,253 A | * | 7/1999 | Brueckheimer et al. .... | 370/395 |
| 5,963,555 A | * | 10/1999 | Takase et al. ................ | 370/395 |
| 6,002,692 A | * | 12/1999 | Wills .......................... | 370/465 |
| 6,034,954 A | * | 3/2000 | Takase et al. .......... | 370/395.61 |
| 6,381,239 B1 | * | 4/2002 | Atkinson et al. ........... | 370/362 |

FOREIGN PATENT DOCUMENTS

| | | |
|---|---|---|
| WO | 94/03004 | 2/1994 |
| WO | 00/02410 | 1/2000 |

OTHER PUBLICATIONS

PCT Search Report mailed Jan. 29, 2001, from the International Preliminary Examining Authority.
International Search Report mailed Jul. 4, 2000 in counterpart PCT application No. PCT/US00/06481.
Peres, Mauricio, "Schalten wie in der Formel 1," Elektronik, De, Franzais Verlag GMBH, Munchen, vol. 47, No. 14, Jul. 1998, pp. 68–77, XP000669736.
LUC4AS01 ATM Switch Element (ASX) Advance Product Brief by Lucent Technologies, Mar. 1997.

(List continued on next page.)

Primary Examiner—Chau Nguyen
Assistant Examiner—Andy Lee
(74) Attorney, Agent, or Firm—Blakely, Sokoloff, Taylor & Zafman LLP (57) ABSTRACT

A switch apparatus and method according to the invention implements a three stage switching process. Various types of media streams presented to the switch apparatus by the broadband and narrowband connections are adapted for switching by being converted to ATM cells and enqueued in corresponding virtual circuit (VC) queues. ATM cell switching is performed among the different cards based on the quality of service requirement for each virtual circuit. The switched ATM cells are then converted to the outgoing media types and outputted to the necessary broadband and narrowband connections. The switch apparatus and method is further adapted to perform rate shaping and traffic management so as to guarantee the quality of service for various media types (voice, video, data) and also minimize the traffic loss due to rate mismatch between narrowband and broadband connections during the burst period. By virtue of this implementation, the switch apparatus and method of the present invention can perform any-to-any media type switching.

31 Claims, 8 Drawing Sheets

OTHER PUBLICATIONS

Atlanta ATM Switch Core Chip Set Product Brief by Lucent Technologies, Mar. 1997.

"Lucent Technologies Announces Scaleable ATM–Switch Chip Set for High–Performance Switching Systems," Lucent Technologies Press Release, Mar. 24, 1997.

LUC4AU01 ATM Layer UNI Manager (ALM) Preliminary Product Brief by Lucent Technologies, Mar. 1997.

International Telecommunication Union (ITU). ITU–T, I.432, Integrated Services Digital Network (ISDN), ISDN User–Network Interfaces, B–ISDN User–Network Interface—Physical Layer Specification, (Mar. 1993).

International Telecommunication Union (ITU), ITU–T, I.432.1. Series I: Integrated Services Digital Network, ISDN User–Network Interfaces—Layer 1 Recommendations, B–ISDN User–Network Interface—Physical Layer Specification: General characteristics, (Aug. 1996).

International Telecommunication Union (ITU), ITU–T, I.432.2. Series I: Integrated Services Digital Network, ISDN User–Network Interfaces—Layer 1 Recommendations, B–ISDN User–Network Interface—Physical Layer Specification: 155 520 kbit.s and 622 080 kbit/s operation. (Aug. 1996).

International Telecommunication Union (ITU), ITU–T, I.432.3 Series I: Integrated Services Digital Network, ISDN User–Network Interfaces—Layer 1 Recommendations, B–ISDN User–Network Interface—Physical Layer Specification: 1544 kbit/s and 2048 kbit/s operation. (Aug. 1996).

International Telecommunication Union (ITU). ITU–T, I.432.4. Series I: Integrated Services Digital Network, ISDN User–Network Interfaces—Layer 1 Recommendations, B–ISDN User–Network Interface—Physical Layer Specification: 51 840 kbit/s operation. (Aug. 1996).

International Telecommunication Union (ITU). ITU–T, G.804. Digital Networks. ATM Cell Mapping into Plesiochronous Digital Hierarchy (PDH). (Nov. 1993).

* cited by examiner

MULTIMEDIA AND MULTIRATE SWITCHING METHOD AND APPARATUS

This application claims priority under 35 U.S.C. §119(e) from provisional patent application U.S. Provisional Application No. 60/123,798 filed under 37 C.F.R. §1.53(d), entitled "MULTIMEDIA AND MULTIRATE SWITCHING METHOD AND APPARATUS", filed on Mar. 11, 1999.

BACKGROUND OF THE INVENTION

1. Field of the Invention

The present invention relates to carrier class switches, and in particular, to a method and apparatus for providing multimedia and multirate switching in an integrated carrier-class switching platform.

2. Description of the Related Art

Most conventional switches are adapted for switching traffic of a specific media such as voice switches (e.g. 4ESS, DMS200) and data switches (e.g. ATM/Frame Relay), or for switching traffic of a specific speed such as backbone switches (switching traffic among broadband interfaces, e.g. OC-12) and access switches (switching traffic among narrowband interfaces, e.g. DS0).

In particular, a backbone switch typically includes a switching fabric that switches between a certain number (e.g. 8 or 16) of high speed ports such as OC-12 ports. In contrast, low speed traffic is generally switched between low speed ports in an access switch having, for example, a shared bus architecture. For such low speed traffic to access one of the high-speed lines coupled to the switching fabric (and vice-versa), access switches generally include an uplink module to convert the low-speed traffic to high-speed traffic, and a separate OC-12 line is needed to transmit the converted low-speed traffic to the high-speed switching fabric. Such methods typically require one high-speed port to be dedicated for each low-speed uplink connection, thus wasting the available bandwidth on the high-speed port.

Moreover, traffic can typically be switched within one type of network. For example, ATM traffic can only be switched among ATM networks, IP traffic can only be switched among IP networks, etc.

Accordingly, there remains a need in the art for an integrated switching apparatus that provides for switching among both low speed ports (e.g. NxDS0) and high speed ports (e.g. OC-3). Moreover, such a switching apparatus should be able to minimize the traffic loss due to rate mismatch during the burst period.

There further remains a need in the art for a switch apparatus that provides for switching among different types of multimedia streams. Such a switching apparatus should also be able to guarantee the quality of service for the different media types, e.g. voice, video, data.

SUMMARY OF THE INVENTION

Accordingly, an object of the present invention is to provide a switching apparatus and methodology that permits traffic of any speed to be switched between ports of a single device.

Another object of the present invention is to provide a switching apparatus and methodology that permits traffic of any media to be switched in a single device.

Another object of the present invention is to provide a switching apparatus and methodology that minimizes traffic loss due to rate mismatch between narrowband and broadband connections during the burst period.

Another object of the present invention is to provide a switching apparatus and methodology that guarantees quality of service for flows of various media types.

To achieve these objects and others, the switch apparatus and method according to the invention implements a three stage switching process. Various types of media streams presented to the switch apparatus via broadband and narrowband flows (e.g. voice/fax call, video session, packet flow between source and destination ports, etc.) are converted to ATM cells and enqueued in corresponding virtual circuit (VC) queues. ATM cell switching is performed among the different cards based on the quality of service required for each virtual circuit. The switched ATM cells are then converted to the outgoing media types and outputted to the necessary broadband and narrowband flows. The switch apparatus and method are further adapted to perform rate shaping and traffic management so as to guarantee the quality of service for various media types (voice, video, data) and also minimize the traffic loss due to rate mismatch between narrowband and broadband connections during the burst period. By virtue of this implementation, the switch apparatus and method of the present invention can perform any-to-any media type switching.

BRIEF DESCRIPTION OF THE DRAWINGS

These and other objects and advantages of the present invention will become apparent to those skilled in the art after considering the following detailed specification, together with the accompanying drawings wherein.

DETAILED DESCRIPTION OF THE INVENTION

Figure 1:
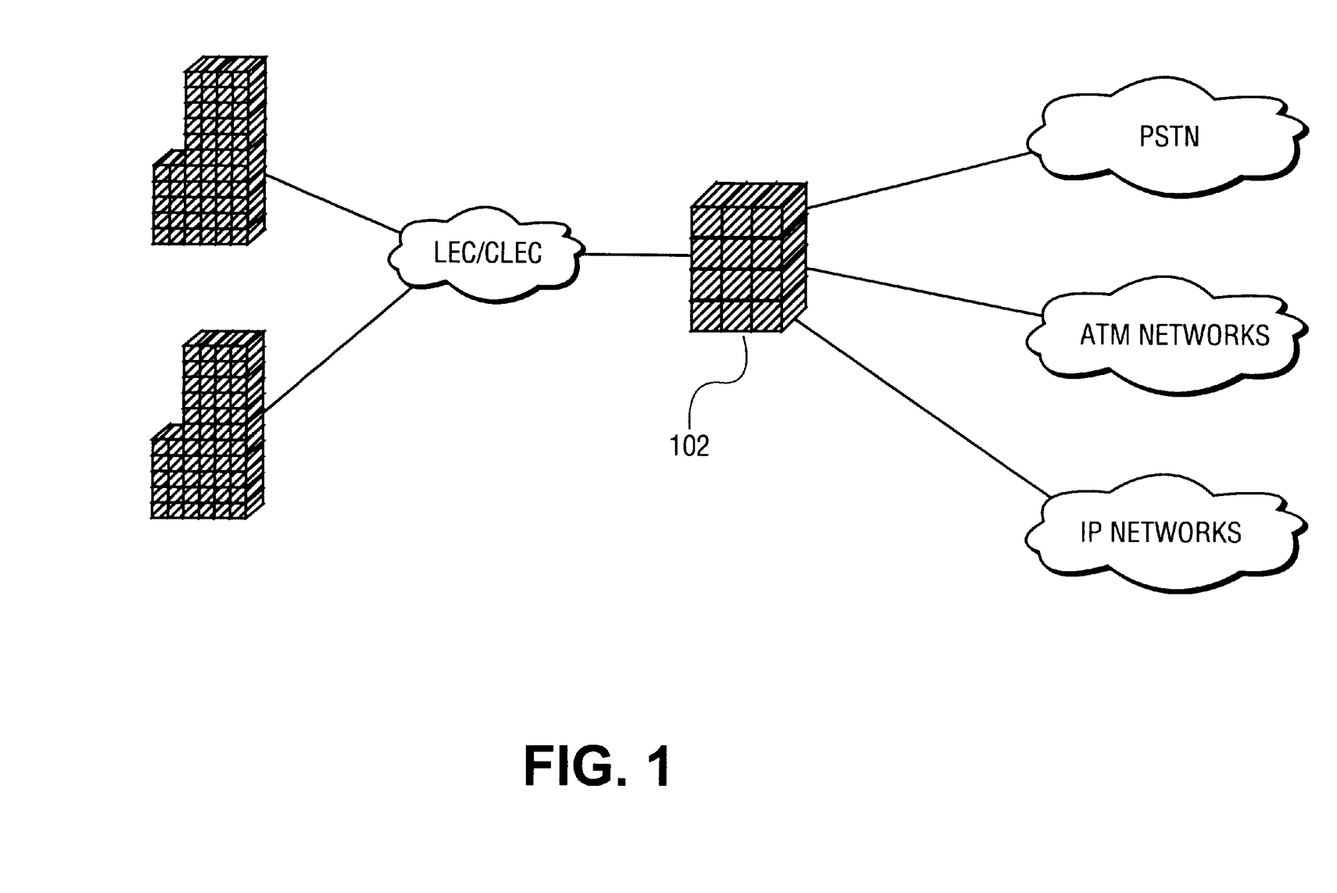
FIG. 1 illustrates an implementation of a switch apparatus according to the present invention.

FIG. 1 illustrates an exemplary implementation of the present invention. As illustrated, a switch apparatus 102 according to the present invention provides, within a single device, the capability to switch flows of any media among LEC/CLECs, PSTNs, and ATM and IP networks.

Figure 2:
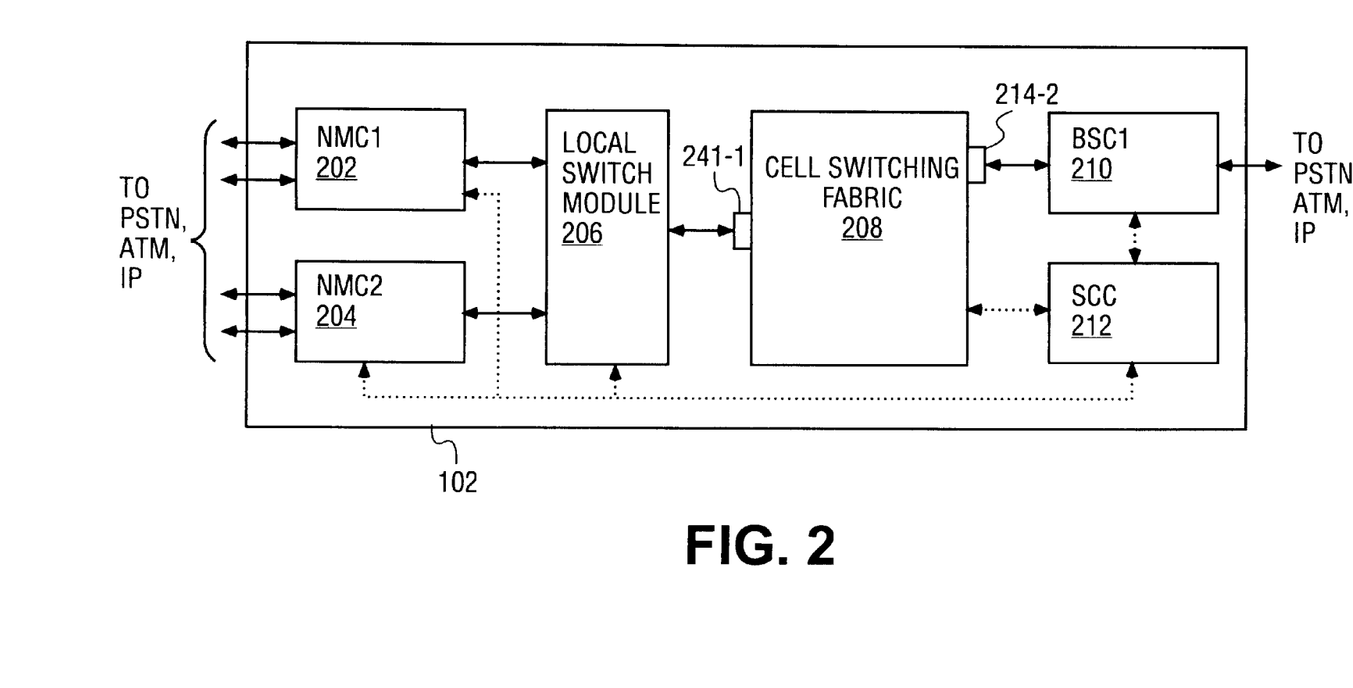
FIG. 2 is a block diagram of a switch apparatus according to the present invention.

An example of a switch apparatus 102 according to the present invention such as that shown in FIG. 1 is further illustrated in FIG. 2.

As shown in FIG. 2, switch apparatus 102 includes an ATM cell switching fabric 208 that switches ATM cell traffic between switch ports 214-1 ... 214-N. Coupled to one of the switch ports is a broadband service card (BSC1) 210 for interfacing with a plurality of broadband connections. Coupled to a second one of the switch ports is a switch control card (SCC) 212. Coupled to another of the switch ports is a local switch module 206. Further coupled to the local switch module 206 is a plurality of narrowband line cards (NMC1, NMC2) 202, 204 for interfacing with a plurality of narrowband connections.

ATM cell switching fabric 208 is, for example, an ATLANTA chipset switch fabric having an 8×8 array of switch elements such as LUC4AS01 ATM Switch Elements made by Lucent Technologies of Allentown, Pa. Such a switch fabric switches ATM traffic between eight switch ports 214-1 ... 214-8 (only two such ports are shown in FIG. 2 for clarity). Switch ports 214 are preferably OC-12 or equivalent ports. An implementation of such an ATM cell switching fabric is described in Lucent Technologies Product Brief, "ATLANTA ATM Switch Core Chip Set," March 1997, the contents of which are incorporated herein by reference.

BSC1 210 provides an interface between one switch port 214-2 of the ATM cell switching fabric 208 and one or more broadband connections such as T3/E3, OC-3, and OC-12 lines and/or ports. Although only one broadband service card is shown, it should be apparent that there may be several.

SCC 212 contains functionality for establishing, routing, and managing virtual circuit connections between the ports of the switch apparatus. An example of an apparatus and method that can be used to implement such functionality is described in co-pending U.S. Provisional Appln. No. 60/142,140, commonly owned by the assignee of the present invention.

Local switch module 206 provides an interface between one switch port 214-1 of the ATM cell switching fabric 208 and one or more narrowband line cards NMC1 202, NMC2 204. The switch port 214-1 of the ATM cell switching fabric 208 that is coupled to local switch module 206 is configured to control, for example, 16 multiPHY devices on the physical layer side. This can be implemented using, for example, a LUC4AU01 ATM Layer UNI Manager (ALM) from Lucent Technologies (not shown). Transfers of ATM cells between ATM cell switching fabric 208 (via ALM) and local switch module 206 are preferably performed via a 16-bit UTOPIA II interface (not shown). The local switch module 206 thus allows all the narrowband connections to share the bandwidth of one broadband connection. This improves the prior art solution of separately adapting one broadband connection for each narrowband interface.

NMC1 202 and NMC2 204 each provide an interface between local switching module 206 and one or more narrowband connections such as NXDS0, NxT1/E1, Ethernet, ISDN lines and/or ports. Although two narrowband interface cards are shown, it should be apparent that there may be one or several.

Generally, the switch apparatus illustrated in FIG. 2 implements a three stage switching process. Various types of media streams presented to the switch apparatus by the broadband and narrowband flows are adapted for switching between connected networks by being converted to ATM cells and enqueued in corresponding virtual circuit (VC) queues. ATM cell switching is performed among the different cards based on the quality of service required for each virtual circuit. The switched ATM cells are then converted to the outgoing media types and outputted to the necessary broadband and narrowband connections. The switch apparatus is adapted to perform rate shaping and traffic management so as to guarantee the quality of service for various media types (voice, video, data) and also minimize the traffic loss due to rate mismatch between narrowband and broadband connections during the burst period. By virtue of this implementation, the switch apparatus of the present invention can perform any-to-any media type switching as listed in Table 1.

TABLE 1

Switching Matrix

| Input\Output | Voice/Fax/Video | Frame (FR, PPP) | ATM Cell | LAN |
|---|---|---|---|---|
| Voice/Fax/Video | Voice Switching | VoFR/VoIP | VoATM/VoIP | VoIP |
| Frame (FR, PPP) | VoFR/VoIP | Frame Switching | FR/ATM Interworking | Encapsulation e.g. RFC 1490 |
| ATM Cell | VoATM/VoIP | FR/ATM Interworking | Cell Switching | Encapsulation e.g. RFC 1483 |
| LAN | VoIP | Encapsulation e.g. RFC 1490 | Encapsulation e.g. RFC 1483 | LAN Switching |

Figure 3:
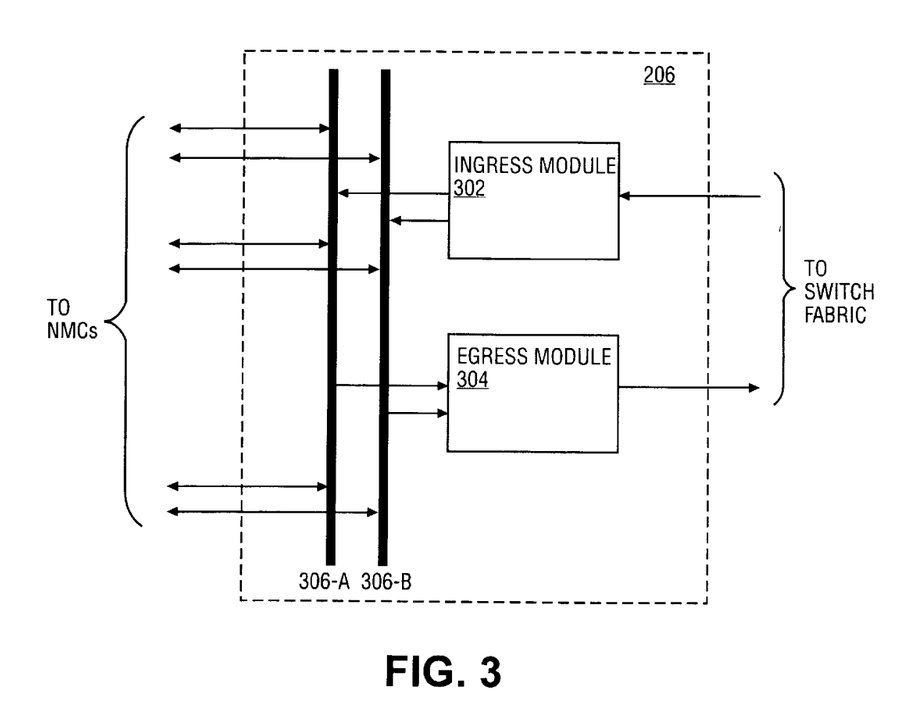
FIG. 3 is a block diagram further illustrating an example of a local switch module that can be included in a switch apparatus of the present invention such as that shown in FIG. 2.

FIG. 3 further illustrates a local switch module 206 such as that included in the switch apparatus 102 shown in FIG. 2. As shown in FIG. 3, local switch module 206 includes shared buses 306-A and 306-B that are coupled to NMCs for communicating ATM cells. Local switch module 206 further includes an ingress module 302 and an egress module 304 that are responsible for interfacing ATM cells between the low-speed NMCs and the high-speed ATM cell switching fabric. Preferably, the ingress and egress modules are separately embodied as FPGAs.

Shared buses 306-A and 306-B are preferably each a Cubit-Pro CellBus from TranSwitch Corp. of Shelton, Conn. As will be explained in more detail below, the shared buses can be configured for load sharing mode, wherein both buses are active at the same time, or they can be configured for redundancy mode, wherein only one of the buses is active.

Figure 4:
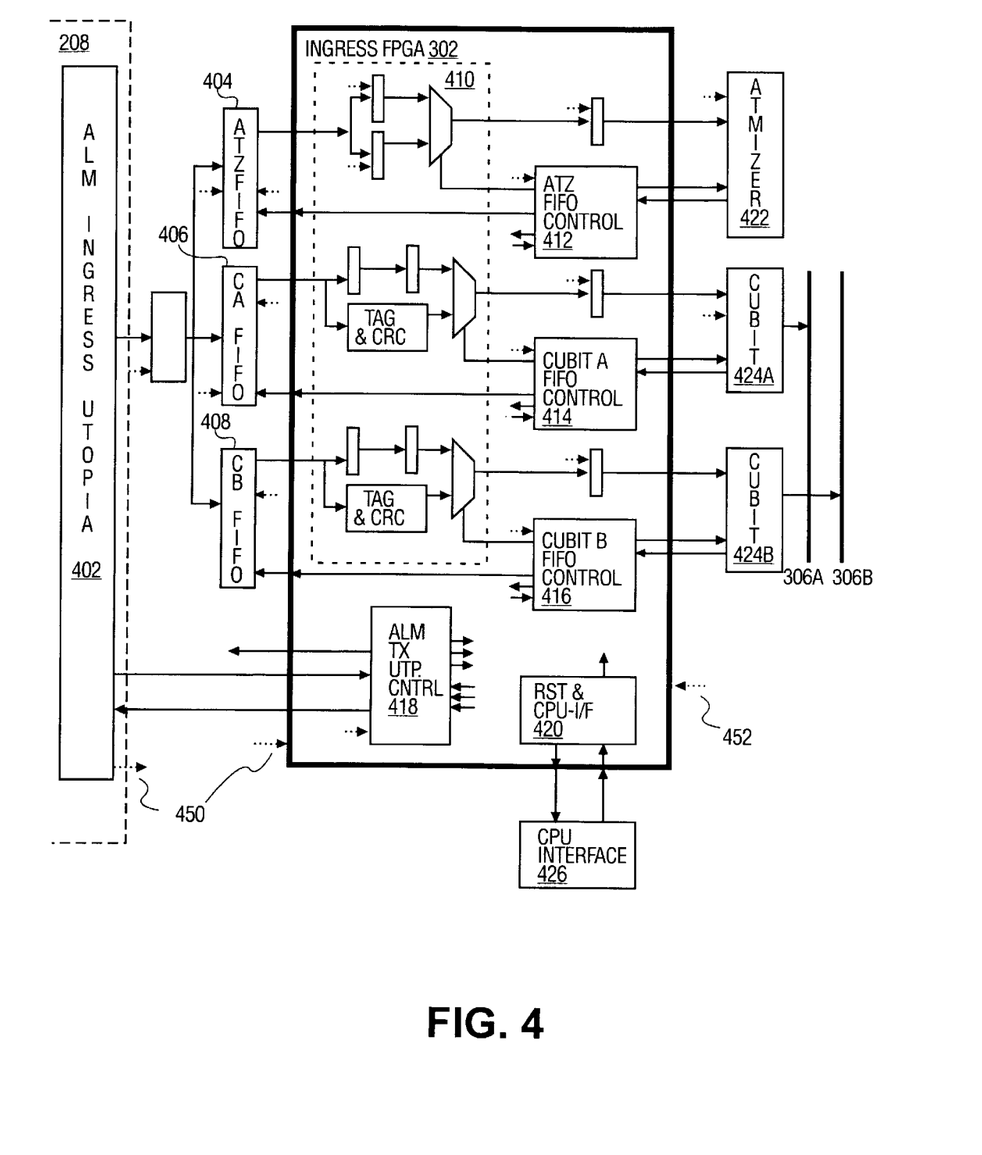
FIG. 4 is a block diagram further illustrating an example of an ingress module that can be included in a local switch module such as that shown in FIG. 3.

FIG. 4 further illustrates an ingress module 302 such as that included in the local switch module 206 shown in FIG. 3.

As shown, ingress module 302 provides interfaces between the ATM cell switching fabric and three PHY devices. The first interface is with the 16 bit ingress UTOPIA II bus of ALM 402 (such as a LUC4AU01 ATM Layer UNI Manager from Lucent Technologies, for example) of ATM cell switching fabric 208. The ingress module is slave to ALM 402 and responds to 16 PHY addresses coming from the ALM. It runs with a 50 MHz clock 450 generated by the ALM and operates in the cell by cell mode. Cells are 27 words long.

The second interface is with the 8 bit UTOPIA bus in which the ingress module is master to the SAR chip 422 (such as an L64364 ATMizer II+ from LSI, for example) TX Utopia. It runs with the 50 MHz clock generated by the ALM and operates in the cell by cell mode. Cells are 53 bytes long. The SAR (ATMizer) chip 422 is used for segmentation and reassembly of AAL5 frames (used for, e.g., intercard communication, SVC, etc.)

The third and fourth interfaces are with the 16 bit UTOPIA-like inlet buses of Cubit chips 424-A and 424-B (such as TXC-05802 Cubit-Pro CellBus switches from TranSwitch Corp. of Shelton, Conn.) are slaves to the ingress module 302. These buses run with a 40 MHz clock 452 and operate in cell by cell mode. Cells are 28 words long including a 1-word routing tag appended in front of them.

As shown, further included is a CPU interface 426 for allowing configuring and error handling of ingress module 302 by an external CPU.

In this example of the invention, the ingress module 302 emulates 16 PHY devices associated with one port of the ATM cell switching fabric 208. According to the setup of these 16 UTOPIA addresses, incoming cells are mapped to the three different data paths. Corresponding to each data path, the ingress module 302 maintains three external synchronous FIFOs 404, 406, 408 for cell storage. Each FIFO can store 8 cells. They also provide clock synchronization for the data. The ingress module 302 generates the control signals for these FIFOs.

In general, cells are received from ALM 402 and stored in the proper FIFOs depending on their UTOPIA addresses and the running mode of ingress module 302. The ingress module 302 can be configured for load sharing, in which both Cubit chips 424-A and 424-B are active, or redundancy, where only one of the Cubit chips is set as the active Cubit chip. If one or more of the FIFOs 404, 406, 408 are almost full, the ingress module will not allow the ALM chip to send more cells to those specific FIFOs. This will be achieved by de-asserting cell space available signals when responding to ALM's Utopia addresses.

Ingress module 302 further periodically polls SAR (ATMizer) chip 422 and the Cubit chips 424-A and 424-B to see if they can receive a cell. If they can, one cell will be read from the corresponding FIFO and sent to the proper PHY chip. This will be done concurrently for each chip.

For cells going to SAR (ATMizer) chip 422, 27 word cells are converted into 53 byte cells by removing the UDF2 byte of the cells. For cells going to Cubit chips 424-A, 424-B, the first word of the cell coming from ALM 402 is sampled and a Routing Tag is generated out of the first word. The last 4 bits of the Tag are generated from the first 12 bits of the generated Tag with CRC-4 calculation over it.

As shown in FIG. 4, ingress module 302 includes a data path module 410, an ALM TX Utopia controller module 418, an ATZ FIFO controller module 412, Cubit FIFO controller modules 414 and 416, and a reset and CPU interface module 420.

Data path module 410 receives cells from the FIFOs and performs the word to byte conversion for the SAR (ATMizer) chip 422 and the TAG generation and insertion for the Cubit chips 424-A, 424-B. Control signals for the muxes come from the respective FIFO controller modules 412, 414, 416.

The ALM TX Utopia controller module 418 interfaces with the ALM's ingress UTOPIA bus control signals portion. It also receives cell space available signals from the FIFO control modules. During normal operation, ALM 402 continuously puts the addresses of the 16 PHY devices on the Utopia address bus. ALM TX Utopia controller 418 responds to this polling by putting the cell space available signals coming from the FIFO control modules for each PHY device. These signals are first synchronized to the ALM's 50 MHz clock 450. If ALM 402 starts to send a cell to one of these PHY devices, ALM TX Utopia controller module 418 will first check an SOC alignment. If SOC is not aligned with the cell, it will be ignored. If the cell is normal, it will be written into the FIFO corresponding to the UTOPIA address and the existing setup, as described below.

If load sharing is enabled, cells with a PHY device number 0–7 will be written into Cubit Pro A FIFO 406, and cells with a PHY device number 9–15 will be written into Cubit Pro B FIFO 408. If load sharing is disabled and if Cubit Pro 424-A is active, cells with a PHY device number 0–7 and 9–15 will be written into Cubit Pro A FIFO 406. If load sharing is disabled and if Cubit Pro 424-B is active, cells with a PHY device number 0–7 and 9–15 will be written into Cubit Pro B FIFO 408. Cells with PHY device number 8 will always be written into ATZ FIFO 404. After the cell is written into the proper FIFO, one increment cell counter signal will be sent to the proper FIFO controller module.

ATZ FIFO controller module 412 runs at the ALM's 50 MHz clock and keeps the cell counter for the ATZ FIFO 404 and provides interfaces to the ALM Utopia bus. If the SAR (ATMizer) chip 422 has cell space available and the corresponding FIFO cell counter indicates that there is a cell available in FIFO 404, this module starts to read the cell from FIFO 404. During this process it will also generate the control signals for the data path module 410 for muxing and UDF2 byte removing. ATZ FIFO controller module 412 assumes that cells were written into the FIFO with proper SOC alignment (this is the responsibility of ALM TX Utopia controller module 418). But if something goes wrong and a cell comes out of the FIFO with a wrong alignment, this module will generate an SOC Error signal to the Reset Module 420. It will also generate a cell space available signal to the ALM TX Utopia module 418 when appropriate.

Cubit FIFO controller modules 414 and 416 respectively manage Cubit Pro chips 424-A and 424-B running at 40 MHz. They keep the cell counters for the FIFOs and provide interfaces to the Cubit 424-A and Cubit 424-B 16-bit cell inlet buses.

If the Cubit chips 424-A, 424-B have cell space available and the corresponding FIFO cell counter indicates that there is a cell available in one of FIFOs 406, 408, these modules start to read the cell from the corresponding FIFO. During this process they will also generate the control signals for the data path module 410 for muxing and tag insertion. The Cubit FIFO controller modules 414, 416 assume that cells were written into the corresponding FIFO 406, 408 with proper SOC alignment (this is the responsibility of ALM TX Utopia controller module 418). But if something goes wrong and a cell comes out of the FIFO with a wrong alignment, these modules will generate SOC Error signals to Reset module 420.

Reset and CPU interface module 420 generates a reset sequence for the following conditions:

(1) Missing SOC signal coming from ATMizer or Cubit FIFOs for cells going from the FIFOs to the PHY devices. This is an error condition on FIFO control, not a missing SOC on the ALM Utopia side to FIFO, in which case the cell is discarded.

(2) ATZ or Cubit chip FIFO overrun condition detected. Normally, the FIFOs can not overflow. When they are almost full, the ALM chip will not be allowed to send more cells using the Utopia control signals.

(3) After each Main reset is given to the chip, the same reset sequence will be started and this condition will be latched on the Err_stat pin as well.

During the reset sequence, the Utopia interfaces are blocked by not allowing any cell operation. Internal logic is reset and the external FIFOs are flushed by generating proper reset signals for them.

Reset and CPU interface module 420 also provides the following pins for access by an external CPU (via CPU interface 426):

(1) "Main_reset_" is an asynchronous active low input signal. It has to be asserted for a minimum period of 1 ms. This will initiate a reset sequence, which resets the chip, indirectly resets the FIFOs and stops the Utopia interfaces. After main reset is de-asserted, it will take 32 clocks to begin operational mode. At the end of the reset sequence, pin "Err_stat" will be set as an acknowledgment, which signal needs to be cleared using the pin "Clear_err_cond".

(2) "Err_stat" is an asynchronous active high output signal. It will be latched for the following conditions.

(a) Missing SOC signal for cells coming from ATMizer or Cubit chip FIFOs to the PHY devices. This is an error condition on FIFO control. This is not a missing SOC on cells coming from the ALM Utopia side to FIFO, in which case the cells will be discarded and the hardware will realign itself to the in-coming cells by searching for cells with a proper SOC indicator.
 (b) FIFO overrun condition detected. Normally the FIFOs can not overflow. When they are almost full, the ALM chip will not be allowed to send more cells to them.
 (c) After each Main reset is given to the chip, the same reset sequence will be started and this condition will be latched on the Err_stat pin as well.

When these conditions (a), (b) and (c) are detected, an auto initialization reset sequence is initiated. This will reset the chip and the FIFOs. This will also hold the Utopia interfaces in the blocking state, which will not allow any cell transfer until the reset sequence is completed.

This signal can be cleared with the signal "clear_err_cond".

(3) "Clear_err_cond" is an asynchronous input signal. It will clear the "Err_stat" output pin.

(4) "Share" signal is an asynchronous active high input signal.
 0=Sharing is disabled (default)
 1=Sharing is enabled. In this case, UTOPIA addresses indicating PHY device numbers 0–7 will cause corresponding cells to be directed to Cubit pro 424-A, and UTOPIA addresses indicating PHY device numbers 9–15 will cause cells to be directed to Cubit pro 424-B (5) "Act_cbt" is an asynchronous input signal. It shows which Cubit pro is the active chip. If sharing is disabled it will have the following functionality:
 0=Cubit pro 424-A is active: UTOPIA addresses indicating PHY device number 0–7 and 9–15 will cause cells to be directed to Cubit pro 424-A
 1=Cubit pro 424-B is active: UTOPIA addresses indicating PHY device number 0–7 and 9–15 will cause cells to be directed to Cubit pro 424-B This signal is ignored if sharing is enabled.

After power up, reset and CPU interface module 420 comes up in the reset mode (since Main reset is an active low signal) and stays in the reset mode until Main reset is de-asserted. Before this signal is de-asserted, the ALM, Cubit and SAR (ATMizer) chips need to be initialized to avoid any initial cell loss.

Figure 5:
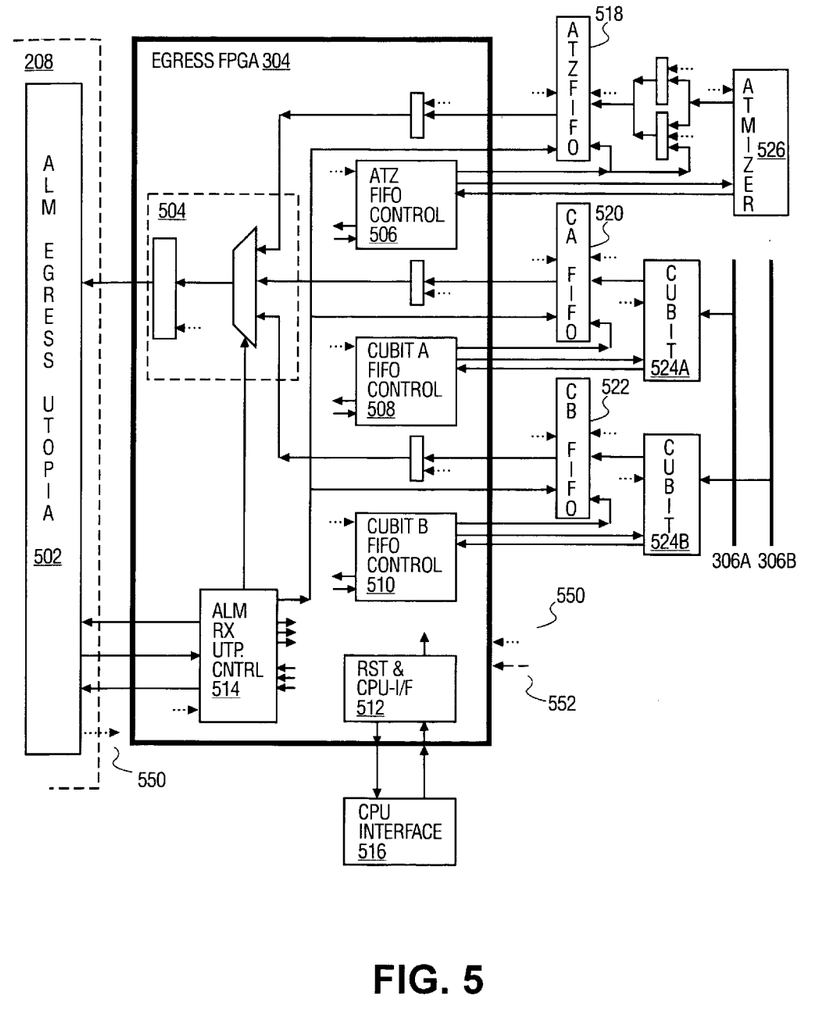
FIG. 5 is a block diagram further illustrating an example of an egress module that can be included in a local switch module such as that shown in FIG. 3.

FIG. 5 further illustrates an egress module 304 such as that included in the local switch module 206 shown in FIG. 3.

The egress module 304 provides interfaces between the ATM cell switching fabric 208 and three PHY devices. The first interface is with the 16 bit egress UTOPIA II bus of the ALM 502 (such as a LUC4AU01 ATM Layer UNI Manager from Lucent Technologies, for example) of the ATM cell switching fabric 208. The egress module 304 is slave to the ALM and responds to single PHY address coming from the ALM 502. It runs with a 50 MHz clock 550 generated by the ALM and operates in the cell by cell mode. Cells are 27 words long.

The second interface with the 8 bit Utopia bus in which the egress module is the master to the SAR chip 526 (such as an L64364 ATMizer II+ from LSI, for example) RX Utopia. It runs with the same 50 MHz clock 550 generated by the ALM and operates in the cell by cell mode. Cells are 53 bytes long. The SAR (ATMizer) chip 526 is used for segmentation and reassembly of AAL5frames (used for, eg., intercard communication, SVC, etc.)

The third and fourth interfaces are with the 16 bit Utopia-like Cubit-pro outlet buses of Cubit chips 524-A and 524-B (such as TXC-05802 Cubit-Pro CellBus switches from Tran-Switch Corp. of Shelton, Conn.) are slaves to the egress module 304. These buses run with a 40 MHz clock and operate in cell by cell mode. Cells are 27 words long with no Routing tag.

As shown, further provided is a CPU interface 516 for allowing an external CPU access for configuring and error handling of egress module 304.

In this example of the invention, egress module 304 emulates a single PHY device associated with one port of the ATM cell switching fabric 208. Accordingly, the three PHY devices are mapped to a single PHY address.

Egress module 304 uses three external synchronous FIFOs 518, 520, 522 for cell storage corresponding to each of the three data paths. The ATZ FIFO 518 can store 8 cells. Cubit FIFOs 520, 522 can store 8 or 144 cells depending on the configuration. The FIFOs also provide clock synchronization for the data. The egress module 304 generates the control signals for the FIFOs.

In general, cells are received from ATMizer or Cubit chips and stored in the proper FIFOs. If one or more of the FIFOs 518, 520, 522 are almost full, the egress module 304 will not allow the PHY chips to send more cells to those specific FIFOs. Cells coming from SAR (ATMizer) chip 526 are converted to a 16-bit format before they are written into FIFO 518. During this process, SOC alignment is also checked. If the SOC alignment is not right, the cell will be discarded and a SOC search will start until proper SOC alignment is found from the PHY chips.

Egress module 304 further periodically polls the ATZ and the Cubit chip FIFOs to see if they have a cell available to send to the ALM 502. This is done in a round-robin fashion. If they have a cell to send, the egress module 302 reads the first three words of the cell from the corresponding FIFO. Then it will start to respond to the UTOPIA addresses coming from the ALM as cells are available (only to the address zero). Cell transfer starts as soon as ALM 502 enables the cell read. At the same time, the rest of the cell from the FIFO is clocked in.

As shown in FIG. 5, egress module 304 includes a data path module 504, an ALM RX Utopia controller module 514, an ATZ FIFO controller module 506, Cubit FIFO controller modules 508, 510, and a reset and CPU interface module 512.

Data path module 504 receives cells from the FIFOs 518, 520, 522 and performs cell multiplexing for the ALM 502. Selection signals come from the ALM RX Utopia controller module 514.

The ALM RX Utopia controller module 514interfaces with the ALM's egress UTOPIA bus control signals portion.

It also receives cell space available signals from the FIFO control modules 506, 508, 510. During normal operation, ALM 502 continuously polls the addresses of the single PHY device on the Utopia address bus. ALM RX Utopia controller 514 also continuously polls the FIFO cell availability signals coming from FIFO controller modules 506, 508, 510. If they indicate that there is a cell available, the corresponding PHY chip will be scheduled for the next transfer. As soon as the current cell transfer operation is completed, the first three words of the next cell will be read from the FIFO. After this, ALM RX Utopia controller 514 starts to respond to the ALM's polling by issuing cell space available signals only for the device which was previously scheduled.

If ALM 502 asserts the read enable signal, ALM RX Utopia controller module 514 will start to send the cell to the Utopia bus. At the same time it will start to read the rest of the cell which was waiting in the FIFO. During this process, the ALM RX Utopia controller module 514 assumes that cells were written into the FIFO with proper SOC alignment (this is the responsibility of FIFO controller module 506, 508, 510). But if something goes wrong and a cell comes out of the FIFO with a wrong alignment, this module will generate an SOC Error signal to the Reset module. The ALM RX Utopia controller module 514 responds to single UTOPIA addresses of zero.

ATZ FIFO controller module 506 runs at the ALM's 50 MHz clock 550 and keeps the cell counter for the ATZ FIFO and provides interfaces to the ALM Utopia bus. If SAR (ATMizer) chip 526 has a cell to send and the corresponding FIFO cell counter indicates that there is room in FIFO 518, this module starts to read the cell from SAR (ATMizer) chip 526. During this process, it checks the SOC alignment. If SOC is not aligned with the cell, it will discard the cell and start searching for properly SOC aligned cells. If SOC is aligned properly, this module will do the byte to word conversion by using external staging registers and will write the cells in to the FIFO 518. It will also generate a cell available signal to the ALM RX Utopia controller module 514.

Cubit A and B FIFO controller modules 508, 510 respectively manage Cubit pro 524-A and 524-B chips running at 40 MHz clock 552. They keep the cell counters for the FIFOs and provide interfaces to the Cubit 524-A and Cubit 524-B 16-bit cell outlet buses.

If one of the Cubit chips 524-A and 524-B has a cell available and the FIFO cell counter indicates that there is room available in the respective FIFO 520, 522, these modules will start to read the cell from the corresponding Cubit chip. During this process they will check SOC alignment. If SOC is not aligned with the cell, they will discard the cell and start searching for properly SOC aligned cells. If SOC is aligned properly, they will write the cells into the corresponding FIFO. They will also generate a cell available signal to the ALM RX Utopia controller module 514.

Reset and CPU interface module 512 generates a reset sequence for the following conditions:

(1) Missing SOC signal coming from ATMizer or Cubit FIFOs for cells going to data path module 504. This is an error condition on FIFO control, in which case the unaligned cell will be discarded.

(2) ATZ or Cubit chip FIFO overrun condition detected. Normally, the FIFOs can not overflow. When they are almost full, PHY chips will not be allowed to send more cells to them using the Utopia control signals.

(3) After each Main reset is given to the chip, the same reset sequence will be started and this condition will be latched on the Err_stat pin as well.

During the reset sequence the Utopia interfaces are blocked by not allowing any cell operation. Internal logic is reset and the external FIFOs are flushed by generating proper reset signals for them.

Reset and CPU interface module 512 also provides the following pins for access by an external CPU (via CPU interface 516):

(1) "Main_reset_" is an asynchronous active low input signal. It has to be asserted for a minimum period of 1 ms. This will initiate a reset sequence, which resets the chip, indirectly resets the FIFOs and stops the Utopia interfaces. After main reset is de-asserted, it will take 32 clocks to go to operational mode. At the end of the sequence, pin "Err_stat" will be set as an acknowledgment, which signal needs to be cleared using the pin "Clear_err_cond".

(2) "Err_stat" is an active high output signal. It will be latched for the following conditions.

(a) Missing SOC signal for cells coming from the ATMizer or Cubit chip FIFOs to the egress module. This is an error condition on FIFO control, not a missing SOC on the ALM Utopia side to FIFO, in which case the unaligned cell will be discarded and hardware will realign itself to the in-coming cells by searching for cells with a proper SOC indicator.

(b) FIFO overrun condition detected. Normally the FIFOs should not overflow, and so this can only be a controller error. When the FIFOs are almost full, PHY chips will not be allowed to send more cells to them.

(c) After each Main reset is given to the chip, the same reset sequence will be started and this condition will be latched on the Err_stat pin as well.

When these conditions (a), (b) and (c) are detected, an auto initialization reset sequence is initiated. This will reset the chip and the FIFOs. This will also hold the Utopia interfaces in the blocking state, in which they will not be allowed to perform any cell transfers until the reset sequence is completed.

This signal can be cleared with the signal "clear_err_cond".

(3) "Clear_err_cond" is an asynchronous input signal. It will clear the "Err_stat" output pin.

(4) "FIFO_Threshold" is an asynchronous input signal. It will determine the depth of the FIFOs for the Cubit chips. This value has to be set up initially and should not be changed during normal operation.

0=Threshold is 8 cells

1=Threshold is 144 cells

After power up, this module comes up in the reset mode (since Main reset is an active low signal) and stays in the reset mode until Main reset is de-asserted. Before this signal is de-asserted, the ALM, Cubit and ATMizer chips need to be initialized to avoid any initial cell loss.

Figure 6:
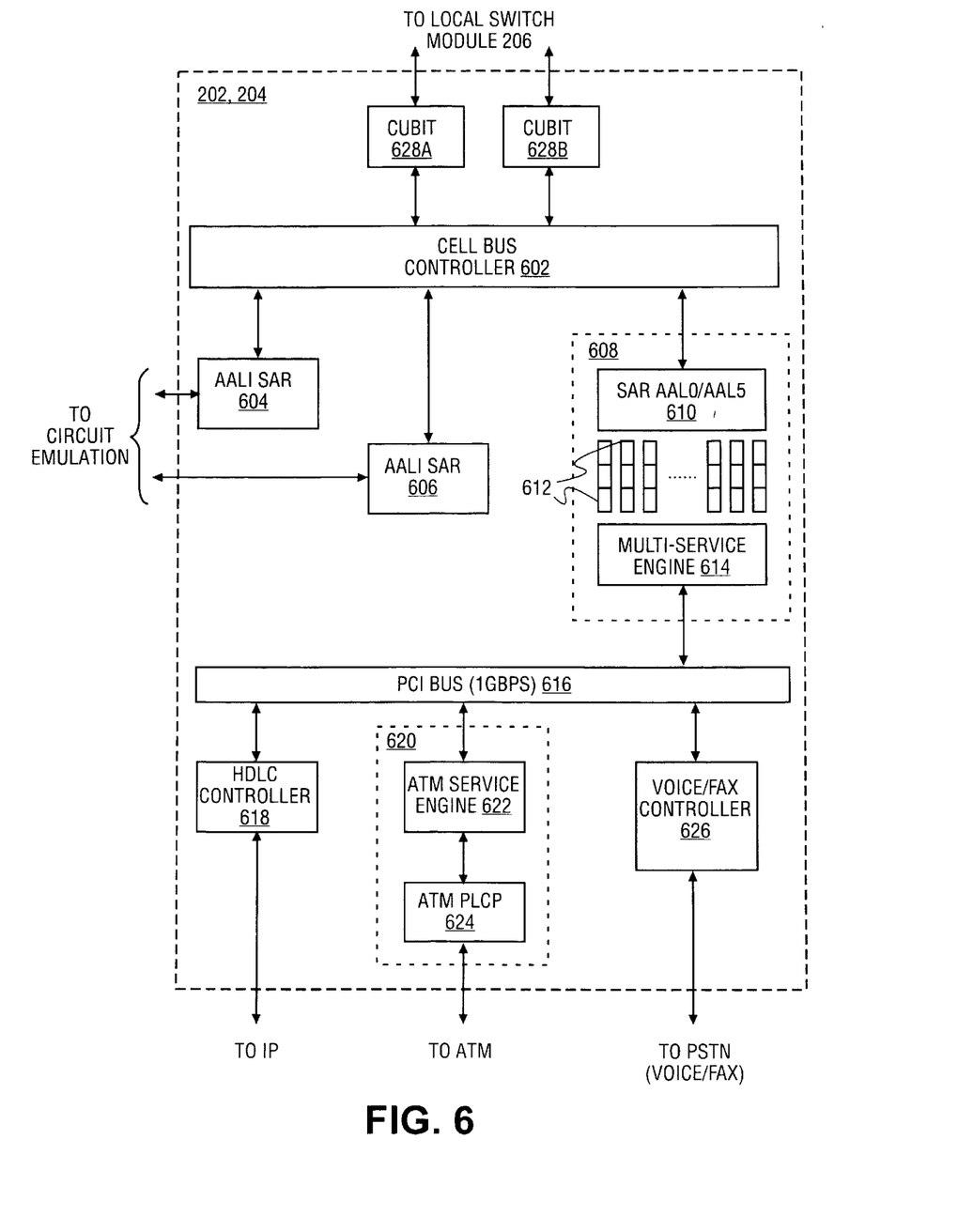
FIG. 6 is a block diagram further illustrating an example of a narrowband service card that can be included in a switch apparatus of the present invention such as that shown in FIG. 2.

FIG. 6 further illustrates a narrowband card 202, 204 that can be included in the switch apparatus 102 illustrated in FIG. 2. It includes a cell bus controller 602 that communicates with two Cubit chips 628-A and 628-B, and a virtual circuit (VC) controller 608. The VC controller 608 further communicates with a packet controller 618, an ATM cell controller 620, and a voice/fax controller 626 via a shared bus 616. The cell bus controller 602 further communicates with first AAL1 SAR chip 604 and second AAL1 SAR chip 606.

The cell bus controller 602 is preferably implemented as a FPGA and provides five Utopia interfaces—between the two Cubit chips 628-A and 628-B, the first AAL1 SAR chip 604, the second AAL1 SAR chip 606 and the VC controller 608. The cell bus controller 602 plays the role of an ATM layer multiplexer device providing interfaces to the shared buses 306-A and 306-B of the local switch module 206 from multiple PHY devices with different priorities. That is, the cell bus controller 602 multiplexes ATM cells from the low-speed interfaces connected to the NMC with the high-speed port of the ATM cell switching fabric, which the NMC shares with other NMCs via the shared bus of the local switch module 206.

The first and second AAL1 SAR chips 604, 606 are, for example, PMC73121 AAL1gator II chips from PMC-Sierra and are programmed to be in the single PHY mode. Between the SAR chips and the cell bus controller there are FIFOs (not shown) which isolate the clocking domains. The SAR's Utopia runs at 33 MHz. The FIFOs are, for example, SuperSync device IDT72261 from IDT of Santa Clara, Calif. The first and second AAL1 SAR chips 604, 606 provide interfaces to ATM networks using T1/E1, T3/E3, and/or supported services.

VC controller 608 is preferably implemented by, for example, an L64364 ATMizer II+ from LSI. The VC controller's Utopia port is also configured to be in the single PHY mode. The Utopia clock runs at 40 MHz which is synchronous to the Cubit's Utopia clock. Also, the ATMizer is preferably configured to ignore parity on the Utopia bus.

As shown, VC controller 608 implemented by, for example an ATMizer chip, includes a SAR AAL0/AAL5 engine 610, a plurality of VC queues 612, and a multi-service engine 614.

Generally, ATM cells received from, or to be sent to, the narrowband interfaces via shared bus 616 are stored in the VC queues 612. The rates at which the VC queues 612 are respectively serviced are determined by the quality of service for the particular flows to which the ATM cells stored in the VC queues belong. SAR engine 610 performs segmentation and reassembly functions for AAL5 frames and cell forwarding for AAL0 frames. It also runs a schedule-based service algorithm to determine which VC queue should be serviced (i.e., for transmitting a cell) at each cell time. VC queues 612 are implemented by a linked list of buffers. Multi-service engine 614 is a software module that performs packet translation if necessary for adapting flows for ATM cell switching in the switching fabric (e.g. FR to ATM network or service interworking), service functions based on header lookup, flow to VC mapping, and queuing of cells to the appropriate per-VC queue 612 . An example of a method and apparatus that can be used to implement the management of quality of service requirements for various flows according to the invention is described in co-pending U.S. Provisional Appln. No. 60/142,140, commonly owned by the assignee of the present invention.

Shared bus 616 is preferably a PCI bus adapted for transfers of 1 Gbps.

Packet controller 618 interfaces between packets and frames that are input/output via attached IP/Frame Relay networks and ATM cells that are input/output via cell bus controller 602 and converted to packets and frames by VC controller 608. Preferably, it includes a HDLC controller (such as a PEB20324 from Siemens, for example) which performs HDLC functions such as bit stuffing/unstuffing, CRC checking, etc. Packets and frames received by packet controller 618 from attached IP/Frame Relay networks are processed by the HDLC controller and sent to multi-service engine 614 via shared bus 616 for conversion to ATM cells and queuing in per-VC queues 612. Conversely, ATM cells destined for attached IP/Frame Relay networks are converted to packets by multi-service engine 614 and forwarded to packet controller 618 via shared bus 616, which then immediately forwards them to the appropriate IP/Frame Relay network port.

ATM cell controller 620 forwards ATM cells that are input from attached ATM networks to multi-service engine 614 via shared bus 616 and forwards ATM cells destined to attached ATM networks that are received from the switch fabric via cell bus controller 602 to the attached ATM networks.

As shown, ATM cell controller 620 preferably includes an ATM service engine 622 and an ATM PLCP 624. ATM service engine 622 performs dual leaky bucket UPC based on ATM Forum 4.0 and uses a VPI/VCI index into a table to find the corresponding VC queue when forwarding cells between multi-service engine 614 and attached ATM networks. ATM PLCP 624 performs ATM physical layer functions according to ITU-I.432 and direct cell mapping to DS1 or E1 transmission systems according to ITU-T G.804.

Voice/fax controller 626 converts voice/fax data that is received via attached PSTN networks into packets that are then forwarded to multi-service engine 614 via shared bus 616, and likewise converts packetized voice/data that is destined for attached PSTN networks and is received from multi-service engine 614 via shared bus 616 into voice/fax data for forwarding over the attached PSTN networks. An example of a method and apparatus that can be used to implement the management of voice/fax flows according to the invention is described in co-pending U.S. Provisional Appln. No. 60/142,140, commonly owned by the assignee of the present invention.

Figure 7:
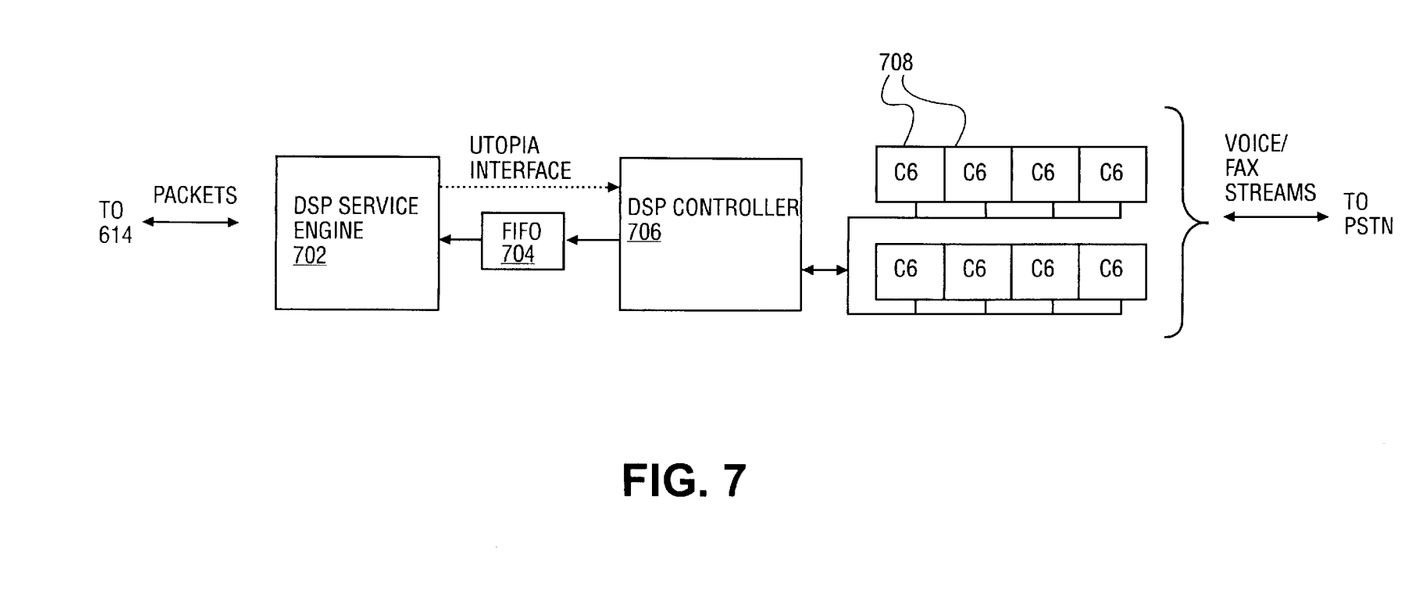
FIG. 7 is a block diagram further illustrating an example of a voice/fax controller module that can be included in a narrowband service card such as that shown in FIG. 6.

FIG. 7 further illustrates a voice/fax controller 626 that can be included in the narrowband line card 202, 204 illustrated in FIG. 6. As shown, it preferably includes a digital signal processor (DSP) service engine 702, a DSP controller 706, and a set of DSPs 708-1 . . . 708-N. DSP service engine 702 is preferably implemented by a LSI L64364 ATMizer II+. DSPs 708 are preferably implemented by TMS320C6201 chips.

As shown, DSP controller 706 provides the interface between the DSP service engine and the DSPs. DSP service engine 702 communicates with DSP controller 706 via a UTOPIA data path interface from which it receives, decodes and executes messages. DSP service engine 702 also controls the DSP controller 706 via its secondary port interface (described below).

DSP service engine 702 operates in slave mode, with cell data outputs from its transmit FIFO (not shown) going to the UTOPIA master, and cell data inputs from DSP controller 706 master being input to its receive FIFO 704. DSP controller 706 accesses the DSPs via its host port interface (described below). DSP service engine is mainly responsible for performing media type adaptation of voice/fax flows received or sent over PSTN networks connected to switch apparatus 102.

A DSP service engine 702 that can be adapted for use in the present invention is described in co-pending U.S. Provisional Application No. 60/142,140, commonly owned by the assignee of the present invention. Briefly, however, TDM-based voice/fax data streams received by voice/fax controller 626 from attached PSTN networks (via a time slot interchanger known in the art, for example) are packetized by the DSPs and stored in DSP output queues (not shown). DSP controller 706 forwards the voice/fax packets from the DSP output queues to DSP service engine 702. DSP service engine 702 then assembles the packets in accordance with the egress media type for the voice/fax connection. If the egress media type is IP, for example, the DSP service engine adds a RTP, UDP, and IP header to the packets and forwards them to multi-service engine 614 via shared bus 616. Conversely, packetized voice/fax data streams are received from multi-service engine 614 via shared bus 616. DSP service engine 702 then converts the packets of the ingress media type into voice/fax data. For example, if the ingress media type was IP, DSP service engine 702 reads the RTP, UDP and IP headers of the packets and writes the packets to the appropriate DSP input queues (not shown). The DSPs convert the packetized data into voice/fax streams for output via attached PSTN networks.

Figure 8:
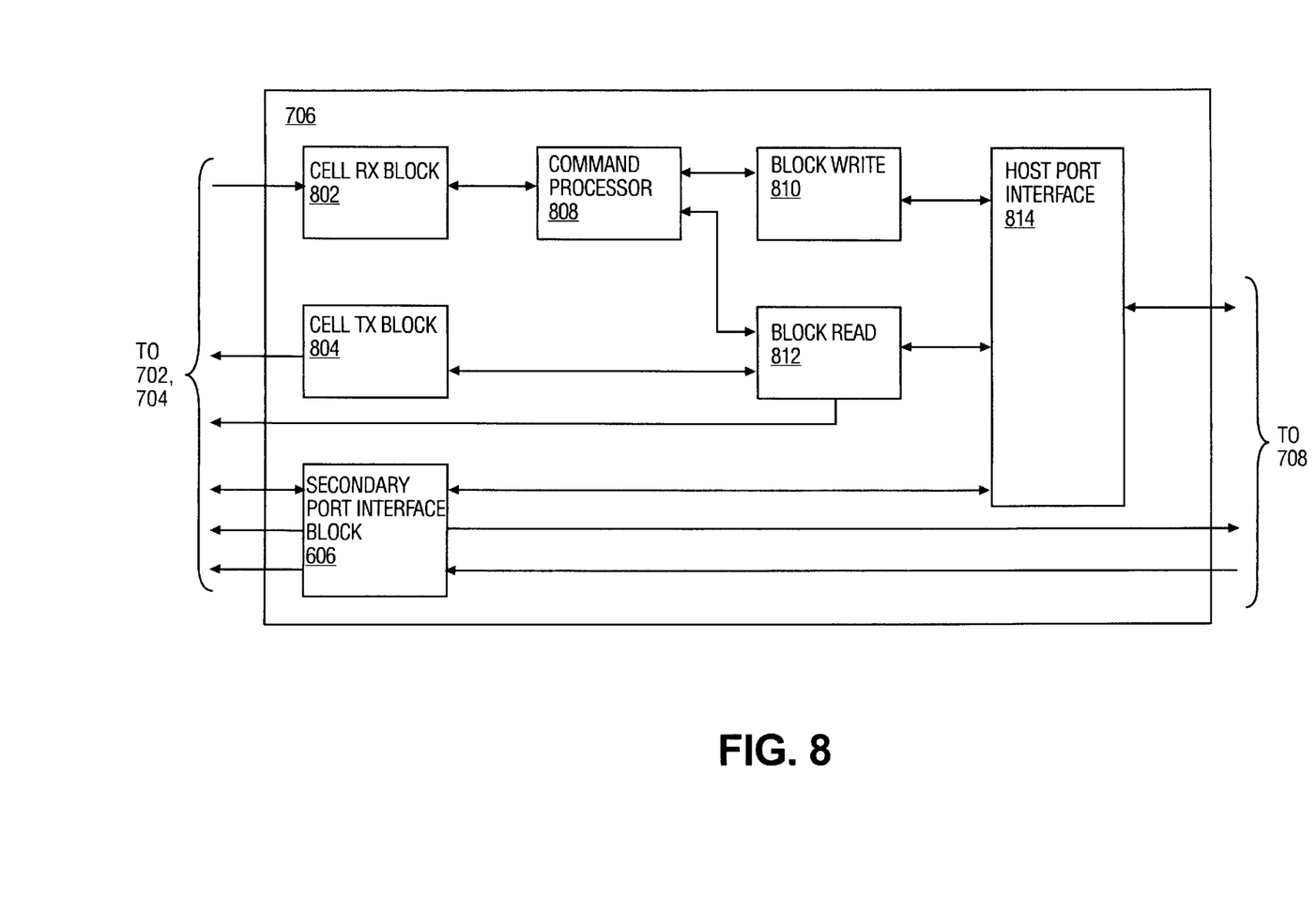
FIG. 8 is a block diagram further illustrating an example of a DSP controller module that can be included in a voice/fax controller module such as that shown in FIG. 7.

FIG. 8 further illustrates a DSP controller 706 such as that illustrated in FIG. 7. As shown, it includes a cell receive block 802, a cell transmit block 804, a command processor 808, a secondary port interface (SPI) block 806, a host port interface (HPI) block 814, and block read unit 812, and a block write unit 810.

The cell receive block 802 interfaces with the DSP service engine 702 receive port. DSP controller 706 acts as Utopia master and DSP service engine 702 as slave. The cell receive block 802 is responsible for loading the messages into internal RAM buffers (not shown), which provide storage for two cells. Command processor 808 issues a load command to cell receive block 802, and cell receive block 802 generates a ready signal when the corresponding buffer contains valid data. The command processor 808 then decodes and executes the contents of the current buffer while cell receive block 802 is loading the next buffer.

Cell receive block 802 checks the parity of the receive data bus and compares it to the incoming parity bit. The parity error bit in Interrupt 0 vector register is set and the DSP controller 706 asserts an interrupt signal when a parity error is detected.

Cell receive block 802 saves the parity bits for the header word, which bits are looped back for a Block Read operation when the header word is written to the external FIFO.

The cell buffers (not shown) are implemented using embedded 256 by 8 bit wide RAMs. The command processor 808 is able to overlap the reading of the buffers with transferring of data to the host port interface 814 by using a "prefetch" mechanism. The command processor 808 asserts a next word load signal and cell receive block 802 automatically reads the next 4 bytes and form a 32 bit word at the buffer data outputs.

Cell transmit block 804 interfaces to DSP service engine 702's transmit port. The block read unit 812 directly writes cell data to external FIFO 704 while the almost full flag remains de-asserted.

Immediately after reset, cell transmit block 804 waits until the block read unit 812 has programmed the external FIFO almost full and almost empty flags. When the external FIFO 704 contains at least one full cell, the almost empty flag will be de-asserted. When the DSP service engine 702 asserts a signal indicating that a cell is available the cell transmit block 804 will proceed to generate the control signals to read the data out of the external FIFO 704 and into the DSP service engine 702. The cell transmit block 804 maintains an octet counter to keep track of the words read out of the external FIFO and to generate a start of cell signal.

A read enable signal is input to the external FIFO 704, which signal is delayed one clock, thus indicating valid data on the input pins. The external FIFO almost empty flag is valid on the second clock following a read cycle and it is registered at the input of the DSP controller 706. The cell transmit state machine 804 samples the internal almost empty flag three clock cycles after the last byte of a cell have been read out of the external FIFO to accommodate the latencies.

SPI block 806 communicates with the secondary port interface of the DSP service engine 702 so as to provide direct access to DSP memory locations, HPI block registers, DSP reset control, reading and clearing of the Interrupt 0 vector register, and reading of the Interrupt 1 vector register.

The SPI runs asynchronously to the DSP controller 706. SPI block 806 detects the falling edge of an access signal from the SPI to initiate a secondary port access to the DSP controller 702, and asserts a ready signal when the cycle is completed. Two address lines and a write enable signal are used to provide access to four addressable locations within the DSP controller 702: a read/write control register, a read/write data register, the Interrupt 0 vector register, and the Interrupt 1 vector register.

The read/write control register is loaded first and is used to set up the starting addresses for reads and writes, as well as selecting one of the DSPs. The OpCode field of the read/write control register and the write enable signal determine the behavior of the read/write operation. An OpCode value of "100" causes a read or write operation to the selected address of the selected DSP to be performed. An OpCode value of "101" causes a write operation into the DSP Reset register. OpCode values of "000" through "011" cause the indicated HPI register of the selected DSP to be accessed for diagnostic purposes.

Selection of the Interrupt 0 and 1 vector registers allows the contents of these registers to be viewed.

Command processor 808 issues buffer load requests to cell receive block 802. When the cell receive block 802 has loaded 64 bytes into a cell buffer it will assert the corresponding buffer ready flag. The command processor 808 decodes the message type field of the header word and asserts a start signal to the block write unit 810 or the block read unit 812. The command processor 808 issues a buffer load request to the alternate buffer while the block write or block read units 810, 812 are operating on the data from the first cell buffer. The command processor 808 also muxes the data and control signals between the cell receive block 802 and the block write and block read units 810, 812.

When block write unit 810 receives a start signal from the command processor 808, it loads the cell data message length field into a message counter register, loads the DSP ID field into a register, and asserts a signal to "prefetch" the read/write DSP address word from the buffer. It asserts an initial request signal to the HPI to let it know that this transfer will load the address register as well as perform one 32 bit data write cycle to the corresponding DSP.

Block write unit 810 waits for an acknowledge signal to be asserted by the HPI. When the HPI acknowledges that the DSP's HPIA register has been loaded, the block write unit 810 will "prefetch" the first data word to be written and again wait for the acknowledge signal. For subsequent write cycles the block write unit 810 asserts subsequent request signals.

Block write unit 810 uses the message counter to keep track of how many 4 byte words are to be written, and it also uses a word counter to keep track of the number of 4 byte words remaining in this cell. It then determines if another cell is needed to complete the block write operation. When all the words in the current cell have been written, a signal is asserted indicating this. It should be noted that the first cell has a payload of 14 words (56 bytes) and subsequent cells have a payload of 15 words (60 bytes).

When block write unit 810 is finished writing all the words indicated by the message counter, it generates a signal to the SPI to assert the End of Block interrupt, which signal further identifies which bit to assert in the Interrupt 0 vector register.

Block read unit 812 drives the data and control signals to the TX FIFO 704. After reset it generates the necessary control signals to program the almost empty flag to be asserted when less than one cell is in the TX FIFO (64 bytes) and the almost full flag is asserted when less than one cell (64 bytes) can be written. When block read unit 812 receives a start signal from the command processor 808, it loads the cell data message length field into a message counter register, loads the DSP ID field into a register, and stores the entire cell data into the header register.

The block read unit then checks the TX FIFO almost full flag. If there is room for an entire cell it writes the header register and asserts a signal to "prefetch" the read/write DSP address word from the buffer. It asserts the initial request signal to the HPI to let it know that this transfer will load the address register as well as perform one 32 bit data read cycle to the corresponding DSP. If there is no room in TX FIFO 704 for an entire cell, the block read unit 812 "aborts" and the cell is not read.

Block write unit 810 waits for an acknowledge signal to be asserted by HPI 814. When the HPI acknowledges that the DSP HPIA register has been loaded, and the first 4 byte word has been read, block read unit 812 writes the data one byte at a time to the TX FIFO 704. Block read unit 812 uses the word counter to determine when a new cell is started and when to write the header register into the TX FIFO.

When the number of words to read does not fill an integral number of cells, block read unit 812 starts the FILL state machine. Its function is to take over and "fill" up the cell with data while the block read unit 812 indicates to the command processor 808 that it is done.

Host port interface 814 is responsible for arbitrating between the secondary port requests and the block read or block write unit requests. Priority is given to SP requests; however, when the block read or block write units 810, 812 assert their initial request signals, the address and data portions of the transfers are not interruptible by the SPI 806.

The arbiter will first check for SPI requests. If an SP initial request signal is asserted, the opcode bits are checked to determine if the secondary port will perform a memory read/write ("100") or if direct access to the DSP HPI registers is required. For direct access the opcode bits will drive the control bits. For memory transfers, the state machine will indicate HPIA during the address cycle and HPID during data cycle. If the secondary port performs a memory access, the DSP ID is checked against the DSP ID of the last block read or block write transfer and the HIT flag is set if the secondary port access is to the same DSP.

If no SP request is asserted, then the block write and block read request signals are checked. If an initial request is made or the HIT flag is true, then the HPIA address register is loaded and a read or write cycle is performed and the HIT flag is cleared. If a data request transfer is made and the HIT flag is false then there is no need to reload the HPIA register.

In the above description of an example of a narrowband card 202, 204 according to the present invention, egress channel adaptation is simply the reverse process of ingress channel adaptation. That is, if necessary ATM cells forwarded to the narrowband card via another narrowband card (via the shared bus of local switch module 206) or from a broadband card (via switch fabric 208 and local switch module 206), are converted into packets or frames as appropriate for forwarding on an attached non-ATM network.

It should be noted that broadband card BSC1 210 also preferably includes similar functionality for adapting ingress and egress broadband flows for switching, for example by enqueueing ATM cells communicated or to be communicated over cell switching fabric 208 in virtual circuit queues, and transforming, if necessary, between such ATM cells and any other media type in accordance with the network on the broadband network connections of BSC1. For example, if an egress media type is Ethernet, the BSC1 reassembles the ATM cells received from cell switching fabric 208 into an AAL5 frame, performs service functions, and enqueues the frame to the corresponding Ethernet MAC Tx queue. Conversely, if an ingress media type is Ethernet, the BSC1 segments AAL5frames from the corresponding Ethernet MAC Rx queue into ATM cells for switching via cell switching fabric 208.

It should be further apparent that the present invention allows for switching flows of data between two broadband networks or two narrowband networks, as well as allowing for switching flows between a broadband network and a narrowband network as is more explicitly described above.

Although the present invention has been described in detail with reference to the preferred embodiments thereof, those skilled in the art will appreciate that various substitutions and modifications can be made to the examples described herein while remaining within the spirit and scope of the invention as defined in the appended claims.

What is claimed is:

1. A switch apparatus integrated in a single switching platform comprising:

a) a switching fabric to switch traffic between a plurality of broadband switching ports, each of the switching ports presenting an ATM User Network Interface (UNI);

b) a local module coupled to one of the plurality broadband switching ports, the local module to:

1) provide a first stream of ATM cells to the other one of the broadband switching ports, the first stream of ATM cells formed by the local module by aggregating a first plurality of lesser ATM cell streams that arise from a plurality of narrowband line cards;

2) receive a second stream of ATM cells from the other one of the broadband switching ports, the second stream of ATM cells decomposed by the local module into a second plurality of lesser ATM cell streams that are directed to the plurality of narrowband line cards;

the local module comprising a pair of shared buses, each of the shared buses being coupled to the plurality of narrowband line cards, the pair of shared buses to:

1) carry the first plurality of lesser ATM cell streams toward the broadband switching port;

2) carry the second plurality of lesser ATM cell streams toward the plurality of narrowband line cards; and c) a narrowband line card that is a member of the plurality of narrowband line cards, the narrowband line card to handle a first portion of the first plurality of lesser ATM cell streams, the narrowband linecard to handle a second portion of the second plurality of lesser ATM cell streams, the narrowband line card comprising:

1) a first plurality of VC queues, each VC queue of the first plurality of VC queues to store ATM cells that are part of the first portion and that belong to the same flow;

2) a second plurality of VC queues, each VC queue of the second plurality of VC queues to store ATM cells that are part of the second portion and that belong to the same flow;

3) a third shared bus over which:

a) traffic received from a plurality of narrowband interfaces is directed, the received traffic directed to the first plurality of VC queues and b) traffic to be transmitted over the plurality of narrowband interfaces is directed, the traffic to be transmitted sourced from the second plurality of VC queue.

2. The switch apparatus of claim 1 wherein one of the narrow band interfaces is an IP interface that transmits and receives packets.

3. The switch apparatus of claim 1 wherein one of the narrow band interfaces is an ATM interface that transmits and receives ATM cells.

4. The switch apparatus of claim 1 wherein one of the narrow band interfaces is a PSTN interface that can transmit voice traffic and/or FAX traffic.

5. The switch apparatus of claim 1 wherein the narrowband line card further comprises a multi-service engine between the pluralities of VC queues, the multi-service engine to convert packets within the received traffic into ATM cells.

6. The switch apparatus of claim 1 wherein the narrowband line card further comprises a cell bus controller between the pluralities of VC queues and a pair of bus interfaces that each interface to a different one of the pair of shared buses.

7. The switch apparatus of claim 1 wherein the local module further comprises a first FIFO to receive ATM cells from a first shared bus of the pair of shared buses and comprises a second FIFO to receive ATM cells from a second shared bus of the pair of shared buses.

8. The switch apparatus of claim 7 wherein the local module further comprises a multiplexer that multiplexes ATM cells from the first and second FIFOs in order to form the first stream of ATM cells.

9. The switch apparatus of claim 1 wherein the local module further comprises first and second FIFOs to receive ATM cells from the second stream of ATM cells, the first FIFO to supply a first shared bus from the pair of shared buses, the second FIFO to supply a second shared bus from the pair of shared buses.

10. The switch apparatus of claim 9 wherein the local module further comprises first and second bus interfaces coupled to the first and second shared buses, respectively, the first bus interface coupled to the first FIFO and the second bus interface coupled to the second FIFO.

11. The switch apparatus of claim 9 wherein the first and second shared buses can execute a shared loading mode wherein ATM cells from the second stream of ATM cells having a first PHY device number range are directed to the first shared bus and ATM cells from the second stream of ATM cells having a second PHY device number range are directed to the second shared bus.

12. The switch apparatus of claim 11 wherein the first and second PHY device number ranges are equal in extent.

13. The switch apparatus of claim 12 wherein the shared loading mode can be disabled such that ATM cells from the second stream of ATM cells having the first and second PHY device number ranges are directed to one of the shared buses from the pair of shared buses.

14. The switch apparatus of claim 11 wherein the shared loading mode can be disabled such that ATM cells from the second stream of ATM cells having the first and second PHY device number ranges are directed to one of the shared buses from the pair of shared buses.

15. The switch apparatus of claim 14 wherein the switch apparatus further comprises a pair of disabled load sharing modes, a first mode wherein ATM cells from the second stream of ATM cells having the first and second PHY device number ranges are directed to the first shared bus, a second mode wherein ATM cells from the second stream of ATM cells having the first and second PHY device number ranges are directed to the second shared bus.

16. The switch apparatus of claim 1 further comprising a broadband service card coupled to another one of the plurality of broadband switching ports, the broadband service card to interface between the other broadband switching port and one or more broadband connections.

17. An apparatus, comprising:
a local module that can be coupled to one of a plurality of broadband switching ports, each of the switching ports presenting an ATM User Network Interface (UNI), the local module to:
  1) provide a first stream of ATM cells to the broadband switching port, the first stream of ATM cells formed by the local module by aggregating a first plurality of lesser ATM cell streams that arise from a plurality of narrowband line cards;
  2) receive a second stream of ATM cells from the broadband switching port, the second stream of ATM cells decomposed by the local module into a second plurality of lesser ATM cell streams that are directed to the plurality of narrowband line cards;
the local module comprising a pair of shared buses, each of the shared buses capable of being coupled to the plurality of narrowband line cards, the pair of shared buses to:
  1) carry the first plurality of lesser ATM cell streams toward the broadband switching port;
  2) carry the second plurality of lesser ATM cell streams toward the plurality of narrowband line cards;
the local module comprising a first FIFO to receive ATM cells from a first shared bus of the pair of shared buses, the local module comprising a second FIFO to receive ATM cells from a second shared bus of the pair of shared buses, the local module further comprising a multiplexer that multiplexes ATM cells from the first and second FIFOs in order to form the first stream of ATM cells; and
the local module comprising third and fourth FIFOs to receive ATM cells from the second stream of ATM cells, the third FIFO to supply the first shared bus, the fourth FIFO to supply the second shared bus, wherein, the first and second shared buses can execute a shared loading mode wherein ATM cells from the second stream of ATM cells having a first PHY device number range are directed to the first shared bus and ATM cells from the second stream of ATM cells having a second PHY device number range are directed to the second shared bus.

18. The apparatus of claim 17 wherein the local module further comprises first and second bus interfaces coupled to the first and second shared buses, respectively, the first bus interface coupled to the first FIFO and the second bus interface coupled to the second FIFO.

19. The apparatus of claim 17 wherein the first and second PHY device number ranges are equal in extent.

20. The apparatus of claim 17 wherein the shared loading mode can be disabled such that ATM cells from the second stream of ATM cells having the first and second PHY device number ranges are directed to one of the shared buses from the pair of shared buses.

21. The switch apparatus of claim 20 wherein the switch apparatus further comprises a pair of disabled load sharing modes, a first mode wherein ATM cells from the second stream of ATM cells having the first and second PHY device number ranges are directed to the first shared bus, a second mode wherein ATM cells from the second stream of ATM cells having the first and second PHY device number ranges are directed to the second shared bus.

22. An apparatus, comprising:
a local module that can be coupled to one of a plurality of broadband switching ports, each of the switching ports presenting an ATM User Network Interface (UNI), the local module to:
1) provide a first stream of ATM cells to the broadband switching port, the first stream of ATM cells formed by the local module by aggregating a first plurality of lesser ATM cell streams that arise from a plurality of narrowband line cards;
2) receive a second stream of ATM cells from the broadband switching port, the second stream of ATM cells decomposed by the local module into a second plurality of lesser ATM cell streams that are directed to the plurality of narrowband line cards;
the local module comprising a pair of means capable of being coupled to the plurality of narrowband line cards, the pair of means for:
1) carrying the first plurality of lesser ATM cell streams toward the broadband switching port;
2) carrying the second plurality of lesser ATM cell streams toward the plurality of narrowband line cards;
the local module comprising second means for receiving ATM cells from a first means of the pair of means, the local module comprising third means for receiving ATM cells from a second means of the pair of means, the local module further comprising fourth means for combining ATM cells from the second and third means in order to form the first stream of ATM cells;
the local module comprising fifth and sixth means to receive ATM cells from the second stream of ATM cells, the fifth means for supplying the first means of the pair of means, the sixth means for supplying the second means of the pair of means, wherein, the first and second means of the pair of means can execute a shared loading mode wherein ATM cells from the second stream of ATM cells having a first PHY device number range are directed to the first means of the pair of means and ATM cells from the second stream of ATM cells having a second PHY device number range are directed to the second means of the pair of means.

23. The apparatus of claim 22 wherein the local module further comprises seventh and eight means for interfacing to the first and second means of the pair of means, respectively, the seventh means coupled to the second means and the eighth means coupled to the third means.

24. The apparatus of claim 22 wherein the first and second PHY device number ranges are equal in extent.

25. The apparatus of claim 22 wherein the shared loading mode can be disabled such that ATM cells from the second stream of ATM cells having the first and second PHY device number ranges are directed to one of the means from the pair of means.

26. The apparatus of claim 25 wherein the apparatus further comprises a pair of disabled load sharing modes, a first mode wherein ATM cells from the second stream of ATM cells having the first and second PHY device number ranges are directed to the first means of the pair of means, a second mode wherein ATM cells from the second stream of ATM cells having the first and second PHY device number ranges are directed to the second means of the pair of means.

27. A method, comprising:
providing a first stream of ATM cells to an ATM User Network Interface (UNI) by aggregating a first plurality of lesser ATM cell streams that arise from a plurality of narrowband line cards, the aggregating further comprising
a) carrying, over a pair of shared buses that are each coupled to a plurality of narrowband line cards, the first plurality of lesser ATM cell streams toward the ATM UNI;
b) receiving at a first FIFO ATM cells received from a first shared bus of the pair of shared buses, and, receiving at a second FIFO ATM cells received from a second shared bus of the pair of shared buses;
c) multiplexing ATM cells from the first and second FIFOs in order to form the first stream of ATM cells; and
receiving a second stream of ATM cells from the ATM UNI and decomposing the second stream of ATM cells into a second plurality of lesser ATM cell streams that are directed to the plurality of narrowband line cards, the decomposing further comprising:
a) receiving ATM cells from the second stream of ATM cells at a third and fourth FIFOs, wherein, ATM cells having a first PHY device number range are directed to the third FIFO and ATM cells having a second PHY device number range are directed to the fourth FIFO;
b) supplying the first shared bus from the third FIFO and supplying the second shared bus with the fourth FIFO;
c) carrying, over the pair of shared buses the second plurality of lesser ATM cell streams toward the plurality of narrowband line cards.

28. The method of claim 27 wherein the first and second PHY device number ranges are equal in extent.

29. The method of claim 27 further comprising disabling a shared loading mode such that ATM cells from the second stream of ATM cells having the first and second PHY device number ranges are directed to one of the shared buses from the pair of shared buses.

30. The method of claim 29 wherein wherein ATM cells from the second stream of ATM cells having the first and second PHY device number ranges are directed to the first shared bus.

31. The method of claim 29 wherein ATM cells from the second stream of ATM cells having the first and second PHY device number ranges are directed to the second shared bus.

* * * * *